United States Patent [19]

Ito et al.

[11] 4,394,472
[45] Jul. 19, 1983

[54] STABILIZED POLYISOPRENE COMPOSITION

[75] Inventors: Tadahiko Ito; Toshio Arao; Nobuo Satoh; Hiroshi Harada, all of Ibaraki, Japan

[73] Assignee: Japan Synthetic Rubber Co., Ltd., Tokyo, Japan

[21] Appl. No.: 332,827

[22] Filed: Dec. 21, 1981

[30] Foreign Application Priority Data

Dec. 25, 1980 [JP] Japan .................................. 184540

[51] Int. Cl.³ .......................... C08K 5/34; C08K 5/52
[52] U.S. Cl. .................................. 524/100; 260/800;
524/101; 524/151; 525/236; 526/340.2
[58] Field of Search ...................... 524/100, 101, 151;
525/236; 526/340.2; 260/800

[56] References Cited

U.S. PATENT DOCUMENTS

| | | | |
|---|---|---|---|
| 2,733,226 | 1/1956 | Hunter | 524/151 |
| 3,080,338 | 3/1963 | Nudenberg et al. | 524/151 |
| 3,114,743 | 12/1963 | Horne, Jr. | 526/340.2 |
| 3,163,630 | 12/1964 | Pampus et al. | 526/183 |
| 3,255,191 | 6/1966 | Dexter et al. | 524/100 |
| 3,361,691 | 1/1968 | Mazzeo | 524/151 |
| 3,535,277 | 10/1970 | Miller et al. | 524/150 |
| 3,824,205 | 7/1974 | Demarcq et al. | 524/151 |
| 4,124,546 | 11/1978 | Rubio, Jr. et al. | 525/236 |

*Primary Examiner*—John Kight, III
*Assistant Examiner*—R. A. White
*Attorney, Agent, or Firm*—Oblon, Fisher, Spivak, McClelland & Maier

[57] ABSTRACT

A stabilized polyisoprene composition comprising 100 parts by weight of polyisoprene and 0.15–3.0 parts by weight of a binary system antioxidant consisting of 50–99% by weight of a phosphite type antioxidant represented by the formula,

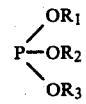

wherein $R_1$, $R_2$, and $R_3$ are same or different aryl groups, and 50–1% by weight of a triazine derivative type antioxidant represented by the formula,

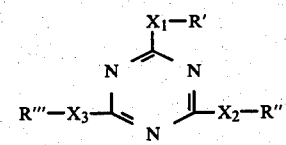

wherein $X_1$, $X_2$, and $X_3$, which may be the same or different, are selected from the group consisting of —NH—, —O—, and —S—, and R', R", and R''', which may be the same or different, represent alkyl, or alkyl-substituted or unsubstituted hydroxyphenyl groups. This binary system antioxidant exhibits a synergistic effect on the stabilization of polyisoprene against heat and oxygen.

9 Claims, No Drawings

STABILIZED POLYISOPRENE COMPOSITION

This invention relates to a stabilized polyisoprene composition improved in strage stability and in resistance to discoloration or staining as well as in stability to heat and oxygen, by adding a mixture of a phosphite type antioxidant and a triazine derivative type antioxidant to polyisoprene.

Polyisoprene has substantially the same chemical structure as does natural rubber and an excellent processability. Vulcanized polyisoprene is also similar in physical properties to vulcanized natural rubber, so that the consumption of polyisoprene, as a general purpose rubber, has been increasing. Polyisoprene has, however, the disadvantage of being unstable to heat and oxygen because it does not contain any impurities such as proteins, phosphorous, amines, and the like.

In order to overcome this disadvantage, it is necessary that an antioxidant satisfying the following requirements be added to polyisoprene: (1) It does not adversely affect the functions of product. (2) It exhibits a good stabilizing action even when added in a small amount. (3) It has a low discloring tendency. (4) It is less toxic. As an antioxidant meeting these requirements, butylated hydroxytoluene (hereinafter, shortened as BHT) has been used generally. However, BHT has the disadvantages that since the volatility is great, (1) it is necessary to adjust the amount thereof by additionally incorporating the same, and (2) World Health Organization advised in 1973 that BHT has a question of toxicity.

As a result of extensive studies to solve these problems, the present inventors have found that a polyisoprene composition having an excellent stability can be obtained by adding a small amount of a binary system antioxidant consisting of a phosphite type antioxidant and a triazine derivative type antioxidant.

According to this invention, there is provided a stabilized polyisoprene composition comprising 100 parts by weight of polyisoprene and 0.15-3.0 parts by weight of a binary system antioxidant consisting of 50-99% by weight of a phosphite type antioxidant represented by the formula,

(I)

wherein $R_1$, $R_2$, and $R_3$, which may be the same or different, represent aryl groups having 6 to 33 carbon atoms, and 50-1% by weight of a triazine derivative type antioxidant represented by the formula,

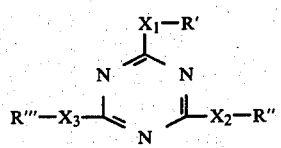

(II)

wherein $X_1$, $X_2$, and $X_3$, which may be the same or different, are selected from the group consisting of —NH—, —O—, and —S—, and R', R", and R''', which may be the same or different, represent alkyl groups having 2 to 15 carbon atoms or alkyl-substituted or unsubstituted hydroxyphenyl groups having 1 to 10 carbon atoms in the alkyl group.

The polyisoprene used in this invention is synthetic cis-1,4-polyisoprene having a cis-1,4 configuration content of at least 80%, and a part thereof may be substituted by natural rubber.

The phosphite type antioxidant used in this invention is represented by the formula,

(I)

wherein $R_1$, $R_2$, and $R_3$, which may be the same or different, represent aryl groups having 6 to 33 carbon atoms, preferably 15 to 24 carbon atoms, and includes, for example, tris(nonylphenyl) phosphite (hereinafter, referred to as TNP), tris(bi-mono- and di-nonylphenyl) phosphite, $(C_9H_{19})_2$—$C_6H_3$—O—P$\{$—O—$C_6H_4$—$C_9H_{19})_2$, (hereinafter, referred to as TNPP), tris(mono- and bi-di-nonylphenyl) phosphite, tris(di-nonylphenyl) phosphite, tris(di-cyclohexylphenyl) phosphite, triphenyl phosphite, tris(di-t-butylphenyl) phosphite, tris(di-octylphenyl) phosphite and mixtures thereof. Among these antioxidants, TNP and TNPP are preferred.

The triazine derivative type antioxidant used in this invention is represented by the formula,

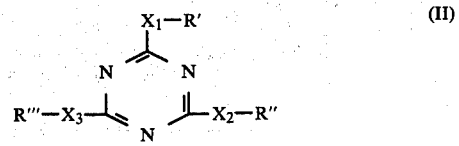

(II)

wherein $X_1$, $X_2$, and $X_3$, which may be the same or different, are selected from the group consisting of —NH—, —O—, and —S—, and R', R", and R''', which may be the same or different, represent alkyl groups having 2 to 15 carbon atoms, preferably 4 to 12 carbon atoms, or alkyl-substituted or unsubstituted hydroxyphenyl groups having 1 to 10 carbon atoms, preferably 1 to 6 carbon atoms, in the alkyl group, and includes, for example, 6-(4'-hydroxy-3',5'-di-t-butylanilino)-2,4-bis(octylthio)-1,3,5-triazine (hereinafter, referred to as HATT), 6-(4'-hydroxy-3',5'-dimethylanilino)-2,4-bis(octylthio)-1,3,5-triazine, 6-(4'-hydroxy-3'-methyl-5'-t-butylanilino)-2,4-bis(octylthio)-1,3,5-triazine, 2-octylthio-4,6-bis(3',5'-di-t-butyl-4'-hydroxyanilino)-1,3,5-triazine, 2-octylthio-4,6-bis(3',5'-hydroxyphenoxy)-1,3,5-triazine, and 2,4,6-tris(3',5'-di-t-butyl-4'-hydroxyphenylethoxy)-1,3,5-triazine. Among these antioxidants, HATT is preferred.

The weight ratio of the phosphite type antioxidant/the triazine derivative type antioxidant in the composition of this invention ranges from 50/50 to 99/1, preferably from 70/30 to 95/5. When the proportion of the phosphite antioxidant is less than 50% by weight or more than 99% by weight, the stabilizing effect is poor.

That is to say, the phosphite type antioxidant and the triazine derivative type antioxidant have little stabilizing effect when used alone and they have a marked synergistic stabilizing effect only when used in combination at the ratios specified above. The combination of TNP and HATT has a higher stabilizing effect than the combination of TNPP and HATT.

The proportion of the binary system antioxidant of phosphite type antioxidant and triazine derivative type antioxidant added to polyisoprene in this invention is 0.15-3.0, preferably 0.2-1.0, part by weight per 100 parts by weight of polyisoprene. The stabilizing effect is poor when the proportion is less than 0.15 part by weight, and no further improvement in stabilization can be expected by adding more than 3.0 parts by weight, so that the latter case is as much uneconomical as the extra amount.

The two antioxidants in this invention may be added in admixture or separately to the polymer solution obtained by polymerization; may be added a crumb obtained by removing the solvent from the polymer solution; or may be added when compounding and kneading the polymer on a roll mill or in a Banbury mixer.

Referring to Examples and Comparative Examples, this invention is illustrated below, but this invention should not be understood to be limited thereto.

Samples were prepared in the following manner:

Isoprene was polymerized in a hydrocarbon solvent in the presence of an organometallic catalyst (Ziegler-Natta type), an alcohol or amine was added to the resulting polyisoprene solution to deactivate the catalyst, after which each of the antioxidants BHT, TNP/HATT, TNPP/HATT, TNP, TNPP, and HATT was added to the solution in an amount shown in Table 1 or 2. The resulting mixture was thoroughly stirred, and polyisoprene having a cis-1,4 configuration content of 85% or more was recovered by steam distillation from the hydrocarbon.

Stabilization tests of sample compositions were carried out in the following way: Each polyisoprene composition thus recovered was dried at 60° C. in a vacuum dryer to a moisture content of 0.30% by weight or less and subjected to an aging test in a Geer oven at 90° C. for 4 days or 7 days, and then the changes in Mooney viscosity ($ML_{1+4}$, 100° C.) and the degree of discoloration were compared. The stabilization effect is good in the following order of degree of discoloration: dark brown < brown < yellowish brown < light brown.

EXAMPLES 1-6 AND COMPARATIVE EXAMPLES 1-7

The antioxidants shown in Table 1 were added to polyisoprene, and the resulting compositions were subjected to stabilization test to obtain the results shown in Table 1. It is clear from Table 1 that the joint use of TNP or TNPP with HAPP shows a higher stabilization effect than the single use of TNP, TNPP, or HAPP, and in particular the highest stabilization effect can be obtained at TNP/HAPP or TNPP/HATT=about 90/10. It is also apparent that the binary system of TNPP and HATT is greater in polyisoprene-stabilization effect than the binary system of TNP and HATT.

EXAMPLES 7-16 AND COMPARATIVE EXAMPLES 8-15

Varying amounts of antioxidants were added to polyisoprene as specified in Table 2, and the resulting mixtures were subjected to stabilization test to obtain the results shown in Table 2. It is clear from the test results shown in Table 2 that the binary system of TNP and HATT or TNPP and HATT exhibits a stabilizing effect when added in an amount of 0.2-3.0 parts by weight per 100 parts by weight of polyisoprene and are more effective at a lower concentration than BHT, which is used broadly.

TABLE 1

| | Antioxidant | Mixing ratio (by weight) | Amount added PHR*5 | Initial Mooney viscosity ($ML_{1+4}$, 100° C.) | Mooney viscosity after 7 days ($ML_{1+4}$, 100° C.) | Hue after 7 days*7 |
|---|---|---|---|---|---|---|
| Example | | | | | | |
| 1 | TNP*1/HATT*2 | 50/50 | 1.00 | 86.0 | 31.0 | O |
| 2 | " | 75/25 | " | 85.5 | 47.0 | O |
| 3 | " | 90/10 | " | 86.0 | 58.0 | ⊚ |
| 4 | TNPP*3/HATT*2 | 50/50 | " | 85.5 | 35.5 | O |
| 5 | " | 75/25 | " | 86.0 | 58.0 | O |
| 6 | " | 90/10 | " | 86.5 | 65.0 | ⊚ |
| Comparative Example | | | | | | |
| 1 | BHT*4 | — | " | 86.5 | 47.0 | O |
| 2 | TNP*1/HATT*2 | 0/100 | " | 85.5 | Impossible to measure*6 | X |
| 3 | " | 25/75 | " | 86.0 | " | X |
| 4 | " | 100/0 | " | 86.0 | " | ⊚ |
| 5 | TNPP*3/HATT*2 | 0/100 | " | 85.5 | " | X |
| 6 | " | 25/75 | " | 86.0 | " | X |
| 7 | " | 100/0 | " | 86.0 | " | ⊚ |

Note:
*1TNP: Tris(nonylphenyl) phosphite
*2HATT: 6-(4'-Hydroxy-3',5'-di-t-butylanilino)-2,4-bis(octylthio)-1,3,5-triazine
*3TNPP: Tris(bi-mono- and di-nonylphenyl)phosphite
*4BHT: Butylated hydroxytoluene
*5PHR: parts by weight/100 parts by weight of rubber
*6"Impossible to measure" means that the Mooney viscosity was 20 or less.
*7⊚... yellowish brown or light brown,
O ... brown,
X ... dark brown.

TABLE 2

| | Antioxidant | Amount added (PHR) | Mixing ratio (by weight) | Initial Mooney Viscosity ($ML_{1+4}$, 100° C.) | Mooney viscosity after 4 days ($ML_{1+4}$, 100° C.) | Hue after 7 days |
|---|---|---|---|---|---|---|
| Example | | | | | | |
| 7 | TNP/HATT | 0.20 | 90/10 | 86.5 | 55.0 | O |
| 8 | " | 0.33 | " | 86.0 | 63.0 | ⊚ |

TABLE 2-continued

| | Antioxidant | Amount added (PHR) | Mixing ratio (by weight) | Initial Mooney Viscosity (ML$_{1+4}$, 100° C.) | Mooney viscosity after 4 days (ML$_{1+4}$, 100° C.) | Hue after 7 days |
|---|---|---|---|---|---|---|
| 9 | " | 0.55 | " | 86.0 | 65.0 | O |
| 10 | " | 0.99 | " | 86.0 | 67.5 | ⊚ |
| 11 | " | 1.10 | " | 86.0 | 67.6 | ⊚ |
| 12 | " | 2.00 | " | 86.0 | 67.6 | ⊚ |
| 13 | " | 3.00 | " | 86.0 | 67.8 | ⊚ |
| 14 | TNPP/HATT | 0.20 | " | 86.5 | 63.0 | O |
| 15 | " | 0.33 | " | 87.0 | 72.0 | ⊚ |
| 16 | " | 0.55 | " | 86.0 | 73.5 | ⊚ |
| 17 | " | 0.99 | " | 86.5 | 76.5 | ⊚ |
| 18 | " | 1.10 | " | 86.5 | 77.5 | ⊚ |
| 19 | " | 2.00 | " | 86.5 | 77.2 | ⊚ |
| 20 | " | 3.00 | " | 86.5 | 77.2 | ⊚ |
| Comparative Example | | | | | | |
| 8 | BHT | 0.10 | — | 86.5 | Impossible to measure | X |
| 9 | " | 0.33 | — | 86.0 | 36.0 | O |
| 10 | " | 0.55 | — | 86.0 | 45.0 | O |
| 11 | " | 0.99 | — | 86.5 | 60.5 | O |
| 12 | TNP/HATT | 0.08 | 90/10 | 86.5 | Impossible to measure | O |
| 13 | " | 0.10 | " | 86.5 | 25.0 | O |
| 14 | " | 3.50 | " | 86.5 | 67.8 | ⊚ |
| 15 | TNPP/HATT | 0.08 | " | 86.5 | Impossible to measure | O |
| 16 | " | 0.10 | " | 86.5 | 25.0 | O |
| 17 | " | 3.50 | " | 86.5 | 77.2 | ⊚ |

The Notes in Table 1 applies to this Table.

What is claimed is:

1. A stabilized polyisoprene composition comprising 100 parts by weight of polyisoprene and 0.15–3.0 parts by weight of a binary system antioxidant consisting of a phosphite type antioxidant represented by the formula:

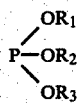

wherein R$_1$, R$_2$ and R$_3$, which may be the same or different, represent aryl or alkaryl groups having 6 to 33 carbon atoms, and
a triazine derivative type antioxidant represented by the formula

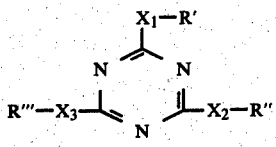

wherein X$_1$, X$_2$ and X$_3$, which may be the same or different, are selected from the group consisting of —NH—, —O—, and —S—, and R', R", and R''', which may be the same or different, represent alkyl groups having 2 to 15 carbon atoms, or alkyl-substituted or unsubstituted hydroxyphenyl groups having 1 to 10 carbon atoms in the alkyl group,
or 2,4,6-tris (3',5'-di-t-butyl-4'-hydroxyphenylethoxy)-1,3,5-trizaine,
wherein the weight ratio of the phosphite type antioxidant to the triazine derivative type antioxidant is 70/10–95/5.

2. A stabilized polyisoprene composition according to claim 1, wherein the aryl or alkaryl groups for R$_1$, R$_2$ and R$_3$ have 15 to 24 carbon atoms, the alkyl groups for R', R" and R''' have 4 to 12 carbon atoms and the alkyl-substituted hydroxyphenyl groups for R', R" and R''' have 1 to 6 carbon atoms in the alkyl group.

3. A stabilized polyisoprene composition according to claim 1, wherein the proportion of the binary system antioxidant is 0.2–1.0 part by weight per 100 parts by weight of polyisoprene.

4. A stabilized polyisoprene composition according to claim 1 or 3, wherein the phosphite type antioxidant is tris(nonylphenyl) phosphite, tris(bi-mono- and di-nonylphenyl) phosphite, tris(mono- and bi-di-nonylphenyl) phosphite, tris(di-nonylphenyl) phosphite, tris(dicyclohexylphenyl) phosphite, triphenyl phosphite, tris(di-t-butylphenyl) phosphite, or tris(di-octylphenyl) phosphite.

5. A stabilized polyisoprene composition according to claim 1 or 3 wherein the phosphite type antioxidant is tris(nonylphenyl) phosphite or tris(mono- and di-nonylphenyl) phosphite.

6. A stabilized polyisoprene composition according to claim 1 or 3, wherein the triazine derivative type antioxidant is 6-(4'-hydroxy-3',5'-di-t-butylanilino)-2,4-bis(octylthio)-1,3,5-triazine, 6-(4'-hydroxy-3',5'-dimethylanilino)-2,4-bis(octylthio)-1,3,5-triazine, 6-(4'-hydroxy-3'-methyl-5'-t-butylanilino)-2,4-bis(octylthio)-1,3,5-triazine, 2-octylthio-4,6-bis(3',5'-di-t-butyl-4'-hydroxyanilino)-1,3,5-triazine, 2-octylthio-4,6-bis(3',5'-di-hydroxyphenoxy)-1,3,5-triazine, 2,4,6-tris(3',5'-di-t-butyl-4'-hydroxyphenoxy)-1,3,5-triazine, or 2,4,6-tris(3',5'-di-t-butyl-4'-hydroxyphenylethoxy)-1,3,5-triazine.

7. A stabilized polyisoprene composition according to claim 5, wherein the triazine derivative type antioxidant is 6-(4'-hydroxy-3',5'-di-t-butylanilino)-2,4-bis(octylthio)-1,3,5-triazine.

8. A stabilized polyisoprene composition according to claim 1, wherein the polyisoprene is a synthetic cis-1,4-polyisoprene having a cis-1,4 configuration content of 80% or more.

9. A stabilized polyisoprene composition according to claim 1, wherein the polyisoprene is a mixture of a synthetic cis-1,4-polyisoprene having a cis-1,4 configuration content of 80% or more and natural rubber.

* * * * *